United States Patent [19]

Seeman

[11] Patent Number: 4,498,918
[45] Date of Patent: * Feb. 12, 1985

[54] METHOD FOR PRODUCING A GLASS ARTICLE

[76] Inventor: Thomas A. Seeman, 1152 Juliet, Toledo, Ohio 43614

[*] Notice: The portion of the term of this patent subsequent to Jun. 8, 1999 has been disclaimed.

[21] Appl. No.: 502,194

[22] Filed: Jun. 8, 1983

[51] Int. Cl.³ ............................................. C03B 40/02
[52] U.S. Cl. ......................................... 65/25.1; 65/26
[58] Field of Search .................. 264/338; 65/24, 25.1, 65/26

[56] References Cited

U.S. PATENT DOCUMENTS

| | | | |
|---|---|---|---|
| 3,052,629 | 9/1962 | Morrow et al. | 252/29 |
| 3,141,752 | 7/1964 | Keller | 65/25.1 |
| 3,508,893 | 4/1970 | Duggan | 65/24 |
| 3,523,016 | 8/1970 | Mattos | 65/170 |
| 3,988,137 | 10/1976 | Goodwin | 65/26 |
| 3,994,703 | 11/1976 | Newing, Jr. et al. | 65/26 |
| 4,333,756 | 6/1982 | Seeman | 65/25.1 |

FOREIGN PATENT DOCUMENTS 688452 10/1979 U.S.S.R. .

OTHER PUBLICATIONS

Monsanto "Certificate of Quality" for Methyl Acetylene Propadiene, dated Jul. 13, 1977.
Synthatron Corporation data sheet for ethyl acetylene.
Synthatron Corporation data sheet for dimethyl acetylene.

Primary Examiner—William Smith
Assistant Examiner—Michael K. Boyer
Attorney, Agent, or Firm—David C. Purdue; John C. Purdue

[57] ABSTRACT

An improvement in a method for producing a glass article is disclosed. The method includes the steps of lubricating the walls of a mold cavity by igniting a gas therein, introducing a gob into the mold cavity, and pressing the gob to a desired shape. The improvement involves the use, as the gas ignited in the mold cavity, of a mixture of a methyl acetylene/propadiene gas and a hydrocarbon gas having an acetylenic triple bond. The proportion of the hydrocarbon having an acetylenic triple bond is controlled to one at which the flame which results from igniting the gas mixture is capable of penetrating an air lock in a deep mold cavity. Usually, the hydrocarbon gas having an acetylenic triple bond has from two to six carbon atoms and constitutes from 1 percent by volume to 10 percent by volume of the gas mixture.

2 Claims, No Drawings

METHOD FOR PRODUCING A GLASS ARTICLE

BACKGROUND OF THE INVENTION

This invention relates to the lubrication of glass pressing apparatus, and more particularly to an improved method and composition for the lubrication of such apparatus. The method and apparatus can be used to produce a pressed glass article or to produce a parison from which a finished article can be blown.

Glass containers, e.g., tumblers and bottles, are frequently produced in an IS machine by placing a charge of heat-softened glass, usually called a "gob", in a mold cavity, advancing a plunger into the mold to form the gob into a parison, transferring the parison to the cavity of a second mold, and blowing the parison to the shape of the second mold. Typical high-speed, modern manufacturing processes employ a plurality of pairs of parison and second molds. Such operations require lubrication of the interior surfaces of the parison mold to prevent, or at least minimize, sticking of the glass to the molds and to minimize wear of the molds.

Various techniques have heretofore been used to lubricate mold surfaces of glass pressing apparatus. For example, one practice is to spray kerosene, light oils, or the like onto the mold surfaces to deposit a lubricous coating. The surfaces have also been swabbed periodically with kerosene, light oil, and the like. These materials, however applied, are ignited by contact with molten glass in the mold or by an external spark or pilot light; their combustion produces carbonaceous residues which are lubricous in nature. Liquefied petroleum and other hydrocarbon gases have also been used by spraying techniques for the lubrication of glass pressing apparatus. Kerosene, light oil, and hydrocarbon gases that have heretofore been used are comparatively undesirable, either generally or when the lubrication of deep parison molds or of molds for pressing of handled ware is desired. The combustion of hydrocarbon gases that have been used is difficult to control in deep parison molds and handled pressing molds; the consequence of insufficiently controlled combustion is inadequate and incomplete lubrication. Atmospheric pollution is caused by the use of kerosene, light oil, and the like.

SUMMARY OF THE INVENTION

The instant invention is based upon the discovery of an improved hydrocarbon composition, and of an improved method for lubricating glass pressing apparatus. The improved method involves the use of the improved hydrocarbon composition. In general, the method can include the steps of:
  (a) introducing a hydrocarbon gas into a mold;
  (b) igniting the gas;
  (c) depositing a gob in the mold; and
  (d) pressing the gob into a parison or a pressed glass article.

According to one embodiment of the improvement of the invention, the hydrocarbon gas which is introduced into the mold is a blend of methyl acetylene gas and methyl acetylene/propadiene gas; the proportions of the two gases in the blend and the amount of the blend introduced into the mold are controlled so that the flame from combustion of the blend penetrates air locks in the mold and, as a consequence, a substantially invisible, lubricous coating is deposited on the interior mold surfaces.

Accordingly, it is an object of this invention to provide an improved method for the lubrication of glass pressing apparatus.

It is a further object of this invention to provide an improved method for the lubrication of molds of conventional apparatus used for producing pressed glass parisons.

It is a still further object of this invention to provide an improved hydrocarbon gas blend which is useful in lubricating glass pressing apparatus.

Other objects and advantages will be apparent from the description which follows, which is intended only to illustrate and disclose, but in no way to limit, the invention.

DESCRIPTION OF THE PREFERRED EMBODIMENTS

The following Example constitutes the best mode presently contemplated by the inventor for carrying out the invention.

EXAMPLE

A blend of methyl acetylene and a methyl acetylene/propadiene gas was introduced periodically into a heated, deep, parison mold of a glass blowing apparatus. The gas blend was formed at a venturi having a nozzle through which the methyl acetylene/propadiene gas was directed, and around which the methyl acetylene gas was introduced. The flow of each of the gases to the venturi was controlled by a two-way Humphrey valve actuated by compressed air. The valves were adjusted so that they delivered, each time they were actuated by compressed air, the required amount of a blend of about 5 percent by volume methyl acetylene and 95 percent by volume of the methyl acetylene/propadiene gas. The blend was ignited by a pilot as it entered the deep parison mold. The required amount of the blend was the minimum which formed a flame that carried to the bottom of the mold. The Humphrey valves were set visually. First, it was observed that reasonable amounts of the methyl acetylene/propadiene gas alone did not form a satisfactory lubricous coating on the mold because an air lock near the bottom thereof was impenetrable to the flame. Next, it was observed that a blend of 3 volume percent of methyl acetylene gas with 97 volume percent of methyl acetylene/propadiene gas gave a better, but still incomplete, penetration of the mold. Then, it was found that a blend of 6 volume percent of methyl acetylene gas with 94 volume percent methyl acetylene/propadiene gas formed flames which penetrated the air lock and reached the bottom of the mold. Finally, the Humphrey valves were adjusted to deliver, each time they were actuated, a blend of substantially 5 percent by volume of methyl acetylene gas with 95 percent by volume of the methyl acetylene/propadiene gas, and substantially the minimum volume of such blend which produced a flame which reached the bottom of the mold. The glass blowing apparatus was then operated normally to produce parisons and to blow deep tumblers from the parisons. The parison mold was closed after removal of each parison therefrom; the Humphrey valves were actuated by compressed air to introduce the mixture of methyl acetylene and methyl acetylene/propadiene gas; the mixture was ignited; and the next gob was then introduced into the parison mold. This procedure was found to provide completely satisfactory lubrication of the parison mold without the need for swabbing thereof with kerosene, light oil or the like.

The methyl acetylene/propadiene gas used in the foregoing Example was purchased under the indicated name from Gulf Oil Canada Limited; it contained 41.73 weight percent of methyl acetylene and propadiene, 6.37 weight percent of butanes, 44.24 weight percent of propylene and 7.66 weight percent of propane.

Such gases are available under that name from many commercial sources. They are, generally, mixtures of about 41 to 65 weight percent of methyl acetylene and propadiene with other $C_3$ and $C_4$ hydrocarbons.

For purposes of comparison, but not in accordance with the instant invention, the procedure described in the preceding Example was repeated, except that the Humphrey valve which controlled the flow of methyl acetylene to the venturi was not actuated so that only charges of the methyl acetylene/propadiene gas were delivered to the mold periodically. It was found that the flame did not reach the bottom of the deep parison mold when the volume of methyl acetylene/propadiene gas was varied from a minimum of about 10 percent of that used in the Example to a maximum of about 2 times that used. It was also ascertained that the deep parison mold was not adequately lubricated to enable continuing operation. Accordingly, so far as is known, it is not possible to use the methyl acetylene/propylene gas described in the Example to achieve satisfactory lubrication of a deep parison mold.

It has been found that a similar problem is encountered when attempts are made to press ware having a handle; the previously identified methyl acetylene/propadiene gas, like other gases which have previously been used to lubricate molds by a flame technique, does not, when it burns, produce a flame which will extend into and lubricate a portion of the mold which forms the handle. However, mixtures as described above of methyl acetylene with the previously identified and other methyl acetylene/propadiene gases are entirely satisfactory for this service, provided that the proportion of methyl acetylene is sufficient to enable the flame which occurs to reach the recessed mold surfaces, i.e., those which form the handle.

It has been found that allylene (sometimes called methyl acetylene), butyne-1 (sometimes called ethylacetylene), butyne-2 (sometimes called cotonylene) and other hydrocarbons having an acetylenic triple bond can be substituted for methyl acetylene. To be useful in practicing the instant invention, in general, such other compound should be a hydrocarbon having from 3 to 6 carbon atoms 2 plus $2(n-2)$ hydrogen atoms, where n is the number of carbons in the compound, and a single acetylenic triple bond. Methyl acetylene, however, is a preferred material for economic reasons and because there is no particular advantage to using any of the other hydrocarbons instead of methyl acetylene. In general, any blend of a hydrocarbon having an acetylenic triple bond and one of the previously identified methyl acetylene/propadiene gases can be used in practicing the instant invention, so long as the proportion of the hydrocarbon having an acetylenic triple bond is sufficiently high that combustion of the gas mixture produces a flame which is capable of penetrating to remote mold regions, for example to the bottoms of deep molds and into the handle-forming portion of molds used for producing handled ware by pressing. Usually, the gas mixture contains from 1 to 10 volume percent of the hydrocarbon containing an acetylenic triple bond with from 99 to 90 volume percent of the methyl acetylene/propadiene gas.

It will be appreciated that various changes and modifications can be made from the specific details of the invention as disclosed herein without departing from the spirit and scope thereof as defined in the appended claims.

I claim:

1. In a method for producing a glass article, which method includes the steps of lubricating the walls of a mold cavity by igniting a gas therein, introducing a gob into the mold cavity, and pressing the gob to a desired shape, the improvement wherein the gas is a mixture of a methyl acetylene/propadiene gas and a gas having an acetylenic triple bond, and the proportion of hydrocarbon having an acetylenic triple bond is controlled to one at which the flame which results from igniting the gas mixture is capable of penetrating an air lock in a deep mold cavity.

2. In a method as claimed in claim 1, the improvement wherein the hydrocarbon gas having an acetylenic triple bond has from 2 to 6 carbon atoms.

* * * * *